3,245,963
RESINOUS POLYCARBONATE ESTERS OF CYCLOHEXANE-1,4-DIMETHANOL

Charles H. Schramm and Morris Zief, Easton, Pa., assignors to J. T. Baker Chemical Company, Phillipsburg, N.J., a corporation of New Jersey
No Drawing. Filed Aug. 23, 1963, Ser. No. 304,210
3 Claims. (Cl. 260—77.5)

This invention relates to resinous polycarbonate esters of cyclohexane-1,4-dimethanol. In a particular aspect, this invention relates to cyclohexane-1,4-dimethanol polycarbonate resins having a softening point above 220° C.

It is a main object of the present invention to provide resins useful in the production of films, sheets, fibers and molded manufactures, which have good heat stability and electrical properties and, which in particular, are colorless and do not exhibit the discoloration characteristic of phenolic resins.

Other objects and advantages of the present invention will become apparent from the following disclosure.

One or more objects of the present invention are accomplished by a process which comprises a transesterification reaction of a carbonate ester and cyclohexane-1,4-dimethanol. The carbonate ester employed is preferably a low molecular weight compound such as a dialkyl carbonate so that the alcohol produced in situ during the transesterification reaction can be distilled continuously during the course of the transesterification reaction to maintain a favorable chemical equilibrium. Illustrative of suitable dicarbonate esters are dimethyl carbonate, diethyl carbonate, dipropyl carbonate and the like. Any carbonate ester can be employed which will permit continuous distillation of the alcohol byproduct produced in the transesterification reaction.

The resinous polycarbonate ester products recovered from the process are extracted with acetone to remove acetone-soluble low molecular weight resin from the product mixture. The acetone-insoluble resin which remains is characterized by a softening point above about 220° C.

This acetone-insoluble polycarbonate ester of cyclohexane-1,4-dimethanol can be readily cast from a solvent such as dimethylformamide to produce clear, tough, flexible films. Moldings produced from the resin are water white and hard. A warm melt of the resin can be easily drawn into long, strong fibers.

In the production of the polycarbonate esters of the present invention, the proportions of cyclohexane-1,4-dimethanol and dialkyl carbonate employed can be varied over a broad range. It is most convenient and practical to employ an equimolar ratio since the reaction proceeds on a mole to mole basis. Preferably, the reactants are employed in a ratio of between about 0.8 and 1.5 mole of dialkyl carbonate per mole of cyclohexane-1,4-dimethanol.

After the completion of the polymerization reaction, the polycarbonate product can be conveniently recovered by dissolving the material in a suitable solvent such as dimethylformamide or dioxane and then precipitating by addition of the solution to water.

Treatment of the crude polycarbonate resin with acetone is necessary in order to remove resin which has an inherent viscosity below about 0.5 as measured in a solution of chloroform at 20° C. It has been found that resin which has an intrinsic viscosity below about 0.5 yields brittle films on casting from solution and brittle molded objects when injection molded. On the other hand, the polycarbonate resin which has an inherent viscosity above about 0.5, and is further characterized by a softening point above about 220° C., can be formed into fibers of good strength, can be cast into water-white clear films which are valuable for packaging purposes and can be molded by conventional procedures to produce toys, insulated electrical equipment, and the like.

The following examples illustrate particular embodiments of the present invention. The inherent viscosity of the polycarbonate resins was measured at 20° C. using 0.5 gram of resin dissolved in 100 milliliters of chloroform.

Example 1

Sodium (115 milligrams) was added to a mixture of cyclohexane-1,4-dimethanol (71 grams, 0.5 mole) and diethyl carbonate (70.8 grams, 0.6 mole). The reaction mixture was heated and ethyl alcohol was continuously removed by distillation. When the polymerization reaction was completed, the reaction mixture was heated in vacuo until the pot temperature reached 325–350° C.

The residual resin product was dissolved in dimethylformamide and the solution was poured into water with stirring. The precipitate that separated was dried and then extracted with acetone. The fractions which were separated and isolated in the form of white powders had the following characteristics:

|  | M.P., ° C. | Inherent viscosity | Wt., g. | Molded at 360° F. |
|---|---|---|---|---|
| (A) Recovered from acetone mother liquors. | 85–140 | ---------- | 12.3 | Opaque, soft, rubbery disc. |
| (B) Separate from acetone concentrate. | 106–111 | 0.25 | 21.7 | Flexible, heterogeneous disc. |
| (C) Acetone-insoluble. | >220 | 0.63 | 28.0 | Clear, rigid disc. |

The combined weight of the fractions amounted to a 73 percent yield. Fractions (A) and (B) afforded brittle films when they were cast from dimethylformamide solution. Fraction (C) yielded a tough, rubbery, flexible film when it was cast from the same solvent.

Example 2

A mixture of sodium (20 milligrams), cyclohexane-1,4-dimethanol (14.4 grams, 0.1 mole) and diethyl carbonate (14.2 grams, 0.12 mole) was heated to a temperature of 150° C. and ethyl alcohol was continuously distilled from the reaction medium. After the polymerization reaction was completed, a solution of 50 milligrams of dimethyl sulfate in 6 milliliters of methanol was added to the product mixture to neutralize the alkalinity. The reaction mixture was then heated at 0.5 millimeter of mercury vacuum until the pot temperature reached 260° C.

Dioxane was added to the reaction product and the mixture refluxed until all the product was dissolved. The resulting solution was poured into water and the white solid which precipitated was recovered. The precipitate was extracted with methanol, then with hot acetone to remove the lower molecular weight resin which amounted to 3.5 grams (20.6 percent) of product.

The acetone-insoluble fraction was dissolved in dioxane and precipitated by pouring the solution into water.

|  | Wt., g. | Yield, percent | M.P., ° C. | Inherent viscosity |
|---|---|---|---|---|
| Acetone-soluble polymer | 3.5 | 20 | 100–120 | 0.23 |
| Acetone-insoluble polymer | 10.0 | 60 | >225 | 0.63 |

The acetone-insoluble fraction yielded water-white hard discs when molded at a temperature of 360° F. Long, strong fibers were easily formed from a warm melt of this fraction. Casting of dimethylformamide solutions of this material afforded clear, tough, flexible films.

Suitable films, fibers, or molded discs could not be produced from the acetone-soluble fraction.

Example 3

A mixture of sodium (20 milligrams), cyclohexane-1,4-dimethanol (14.4 grams, 0.1 mole), and diethyl carbonate (14.2 grams, 0.12 mole) was heated until distillation of ethyl alcohol overhead had ceased. The reaction mixture was heated in vacuo to remove any residual volatile materials. The reaction product was washed with methanol to remove any unreacted sodium. The product was washed with water and dried to yield 16 grams of white powder. The polymeric product had a softening point of 103°–110° C. and an inherent viscosity of 0.26 (0.25 gram in 100 milliliters chloroform, 20° C.).

*Analysis.*—Calc. for $(C_9H_{14}O_3)_x$: C, 63.53; H, 8.23. Found: C, 63.65; H, 8.34.

The infrared absorption spectrum had strong absorption at 1760 centimeters which is characteristic of a linear carbonate.

The polymeric product was heated at a temperature of 150° C. for 15 hours with 2 percent boric acid. The resulting product was a clear, hard polymer.

What is claimed is:

1. A process for preparing a polycarbonate ester which comprises transesterifying dialkyl carbonate having from 1 to 3 carbon atoms in each alkyl group with cyclohexane-1,4-dimethanol to produce a polycarbonate containing both acetone-soluble and acetone-insoluble resin, extracting said resin with acetone and recovering an acetone-insoluble polycarbonate ester having an inherent viscosity above 0.5 and a melting point above about 220.° C.

2. A polycarbonate ester of cyclohexane-1,4-dimethanol and a dialkyl carbonate having from 1 to 3 carbon atoms in each alkyl group, said polycarbonate ester having an inherent viscosity above 0.5 and a melting point above 220° C., and prepared by transesterifying dialkyl carbonate having from 1 to 3 carbon atoms in each alkyl group with cyclohexane-1,4-dimethanol to produce polycarbonate ester containing both acetone-soluble and acetone-insoluble resin, extracting said resin with acetone and recovering an acetone-insoluble polycarbonate ester having an inherent viscosity above 0.5 and a melting point above 220° C.

3. A polycarbonate ester of claim 2 wherein the transesterification is effected with sodium catalyst and the dialkyl carbonate is diethyl carbonate.

References Cited by the Examiner

UNITED STATES PATENTS 2,901,466  8/1959  Kibler et al. _____ 260—77.5

FOREIGN PATENTS 1,264,736  5/1961  France.

SAMUEL H. BLECH, *Primary Examiner.*